(12) United States Patent
Tanaka et al.

(10) Patent No.: US 6,899,944 B2
(45) Date of Patent: May 31, 2005

(54) RETROREFLECTIVE SHEETING HAVING PRINTED LAYER

(75) Inventors: Osamu Tanaka, Tochigi (JP); Ikuo Mimura, Toyama (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 110 days.

(21) Appl. No.: 09/934,839

(22) Filed: Aug. 23, 2001

(65) Prior Publication Data

US 2002/0086143 A1 Jul. 4, 2002

(30) Foreign Application Priority Data

Nov. 10, 2000 (JP) ........................................ 2000-344123

(51) Int. Cl.⁷ .............................................. B32B 27/14
(52) U.S. Cl. .................... 428/195.1; 428/421; 428/220; 428/343; 428/411.1; 359/515; 359/529; 40/584
(58) Field of Search ................................ 428/421, 220, 428/343, 411.1, 195.1, 195, 156, 204; 359/515, 529, 530, 528, 534; 40/584, 612, 200; 283/45, 117; D5/99

(56) References Cited

U.S. PATENT DOCUMENTS

| | | | | |
|---|---|---|---|---|
| 3,994,086 A | * | 11/1976 | Mizuochi | ................... 359/541 |
| 4,082,426 A | * | 4/1978 | Brown | ........................ 359/540 |
| 4,268,117 A | * | 5/1981 | Sevelin | ........................ 359/515 |
| 5,213,872 A | * | 5/1993 | Pricone et al. | ........... 428/195.1 |
| 5,344,705 A | * | 9/1994 | Olsen | ......................... 428/323 |
| 5,376,431 A | * | 12/1994 | Rowland | ..................... 428/164 |
| 5,442,870 A | * | 8/1995 | Kochanowski | .............. 359/527 |
| 5,714,223 A | * | 2/1998 | Araki et al. | ................. 359/529 |
| 6,110,574 A | | 8/2000 | Ochi et al. | |
| 6,120,636 A | * | 9/2000 | Nilsen et al. | ................ 156/230 |
| 6,256,146 B1 | * | 7/2001 | Merrill et al. | .............. 252/585 |
| 6,258,443 B1 | * | 7/2001 | Nilsen et al. | ................ 359/529 |
| 6,416,911 B1 | * | 7/2002 | Mehta et al. | .................. 430/11 |

FOREIGN PATENT DOCUMENTS

| | | |
|---|---|---|
| JP | 09-125562 | 5/1997 |
| JP | 10-044329 | 2/1998 |
| JP | 11-077895 | 3/1999 |
| TW | 264431 | 12/1995 |

* cited by examiner

Primary Examiner—Rena Dye
Assistant Examiner—Tamra L. Dicus
(74) Attorney, Agent, or Firm—Young & Thompson

(57) ABSTRACT

Retroreflective sheeting including a retroreflective base having a light-incident layer on its light-incident side and a fluorine-containing resin film having a total light transmittance of 80% or more which is provided on the light-incident layer by an adhesive layer, a printed layer made of discontinuous printed parts is provided between the film and the adhesive layer. The printed layer does not cause the film to separate.

19 Claims, 3 Drawing Sheets

RETROREFLECTIVE SHEETING HAVING PRINTED LAYER

BACKGROUND OF THE INVENTION

1. Field of the Invention

The present invention relates to retroreflective sheeting having a printed layer useful for signs such as road signs and construction signs; license plates of automobiles, motorcycles, etc.; safety garments and lifesaving equipment; sporting goods such as snow poles; and marking materials such as commercial signboards. In particular, it relates to retroreflective sheeting having a printed layer which hardly ices over or holds snow on its surface in a cold district and, when stained with paint, ink, etc., can be cleaned simply by dry wiping or washing with water without using an organic solvent.

2. Description of the Related Art

A retroreflective sheet which reflects incident light toward the light source is well known, and its excellent visibility owing to the reflection performance has been taken advantage of in various fields as noted above.

However, the state-of-the-art retroreflective sheeting often has problems of reduction in visibility or retroreflective properties when used in cold districts. When temperature drops below 0° C. in winter, water drops adhering to a retroreflective sheet freeze to reduce the retroreflective properties. When it snows, snow tends to adhere to the retroreflective sheet, sometimes completely ruining the display function of the retroreflective sheet.

There is another problem recently encountered that the surface of signs, particularly road signs and construction signs, is intentionally spoiled by marking with paint, ink or another substance out of mischief.

In the light of these problems, the inventors of the present invention previously proposed retroreflective sheeting comprising a base retroreflective sheet having a flat front face layer on the light incident side and a fluorine-containing resin film having a total light transmittance of at least 80% provided on the flat front face layer via an adhesive layer (WO97/22098 and U.S. Pat. No. 6,110,574). The proposed retroreflective sheeting has resistance against icing and snow sticking, which is provided by a simple operation, and, when stained with paint, ink, etc., can be cleaned simply by dry wiping or washing with water without using an organic solvent that may adversely affect human bodies and the environment.

The retroreflective sheet of the U.S. patent has solved the problems discussed above but does not have a printed layer for displays or decoration. Because a fluorine-containing resin film generally has poor adhesion to a printed layer, if a printed layer is provided between the fluorine-containing resin film and the adhesive layer, water, a solvent, etc. may penetrate into the interface between the resin film and the printed layer to cause lifting, which can cause separation of the resin film.

SUMMARY OF THE INVENTION

Accordingly, an object of the present invention is to provide retroreflective sheeting having a printed layer, which sheeting is improved by an easy process to have resistance to icing and snow sticking and, when stained with paint, ink, etc., can easily be cleaned by dry wiping or washing with water without using a cleaning solvent that may do harm to human bodies or the environment and, of which a film, etc. hardly separates during use.

The present invention relates to retroreflective sheeting comprising a retroreflective base having a smooth surface layer on the light-incident side thereof and a fluorine-containing resin film having a total light transmittance of 80% or more which is provided on the smooth surface layer via an adhesive layer, wherein a printed layer made of discontinuous printed parts is provided between the fluorine-containing resin film and the adhesive layer.

Protected by a fluorine-containing resin film having a low surface tension, high weatherability, high solvent resistance and excellent mechanical strength, the retroreflective sheeting according to the present invention hardly allows icing or snow sticking in cold districts. When stained with paint, ink, etc., the retroreflective sheeting of the present invention can easily be cleaned simply by dry wiping or washing with water with no need to use an organic solvent. Therefore, it is advantageously applied to signs such as road signs and construction signs; license plates of automobiles, motorcycles, etc.; safety garments and lifesaving equipment; sporting goods such as snow poles; and marking materials such as commercial signboards.

Where the retroreflective sheet having a printed layer of the present invention is used outdoors or when it is cleaned with a solvent, water or a cleaning solvent may penetrate into the interface between the fluorine-containing resin film and the printed layer. Even if such happens, since the printed area is provided discontinuously, penetrating water, etc. stays in some independent printed parts and is not allowed to spread all over the sheeting.

BRIEF DESCRIPTION OF THE DRAWINGS

The present invention will be more particularly described with reference to the accompanying drawings, in which.

DETAILED DESCRIPTION OF THE PREFERRED EMBODIMENTS

Figure 1:
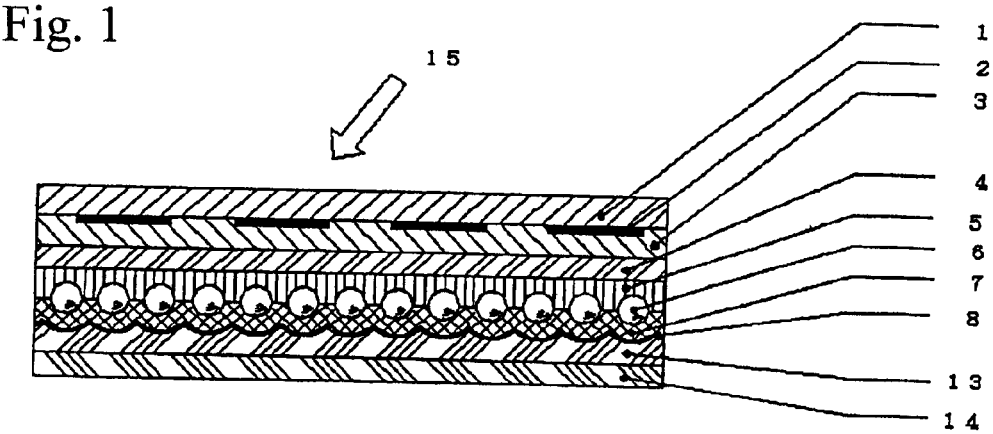
FIG. 1 is an enlarged cross-section of an example of the retroreflective sheeting according to the present invention, in which enclosed lens retroreflective sheeting is used as a base.
Figure 2:
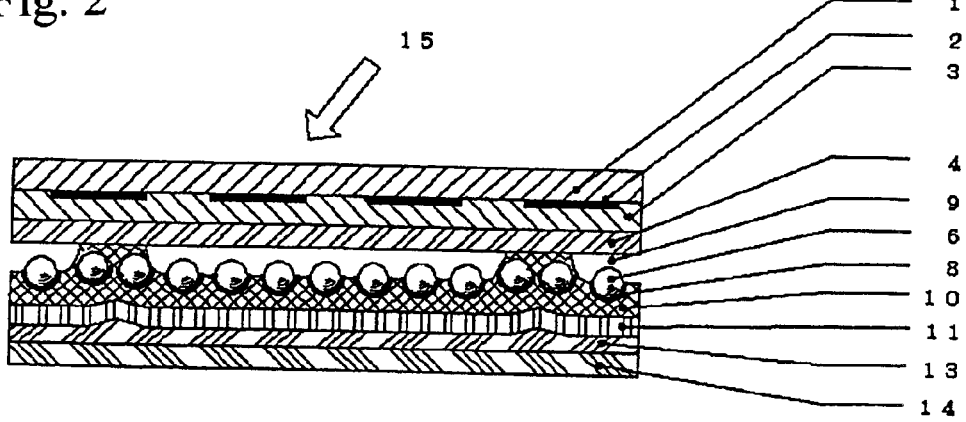
FIG. 2 is an enlarged cross-section of an example of the retroreflective sheeting according to the present invention, in which encapsulated lens retroreflective sheeting is used as a base.
Figure 3:
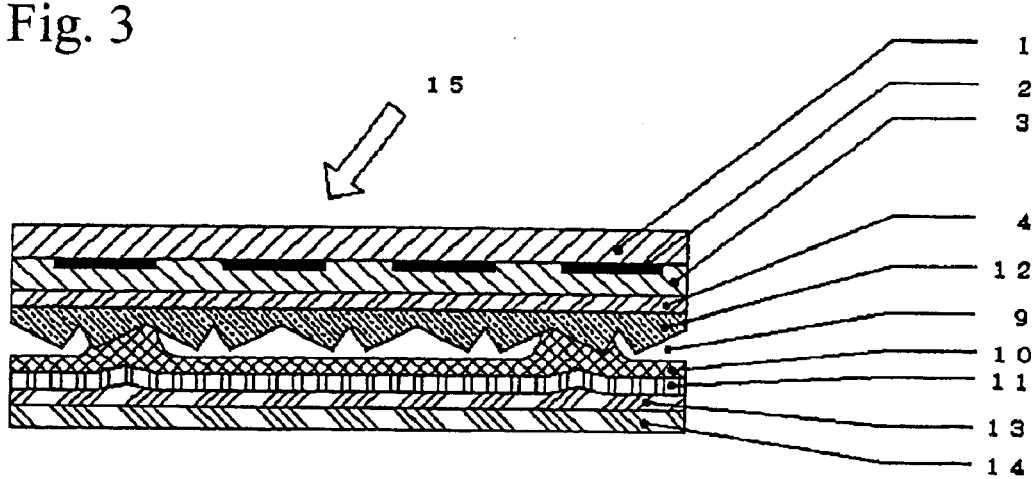
FIG. 3 is an enlarged cross-section of an example of the retroreflective sheeting according to the present invention, in which encapsulated cube-corner retroreflective sheeting is used as a base.
Figure 4:
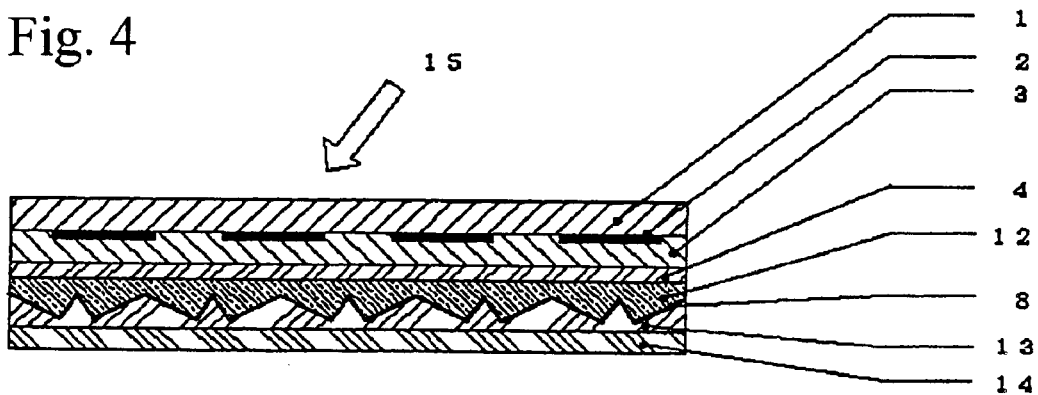
FIG. 4 is an enlarged cross-section of an example of the retroreflective sheeting according to the present invention, in which a metallized cube-corner retroreflective sheeting is used as a base.

The retroreflective base on which a fluorine-containing resin film is provided is not particularly limited, provided that it has a smooth surface layer on its light-incident side i.e., it has a flat front face. For example, an enclosed lens retroreflective sheet as shown in FIG. 1, an encapsulated lens retroreflective sheet as shown in FIG. 2, an encapsulated cube-corner retroreflective sheet as shown iii FIG. 3, and a metallized cube-corner retroreflective sheet as shown in FIG. 4 can be used. These types of retroreflective sheeting are known and commercially available. For details of structures and methods of production, reference can be made to, e.g., U.S. Pat. No. 4,025,674 or JP-B-56-2921 (enclosed lens type), U.S. Pat. No. 4,653,854 or JP-A-60-194405 (encapsulated lens type), U.S. Pat. No. 3,417,959 (encapsulated cube-corner type) and U.S. Pat. No. 3,712,706 or JP-A-49-106839 (metallized cube-corner type). FIGS. 1 to 4 each present an enlarged cross-sectional view of an example of the retroreflective sheeting according to the present invention, in which the above-described retroreflective base has on the light-incident surface layer 4 thereof an adhesive layer 3, a printed layer 2, and a fluorine-containing resin film 1 in this order. In the cross-sections, numeral 5 indicates a beads fixing layer; 6 indicates glass beads; 7 is a focusing layer; 8 is a reflective layer; 9 is an air layer; 10 is a binder layer; 11 is a support layer; 12 is a prism layer; 13 is an adhesive layer; 14 is a separating material layer; and 15 is the incident light.

The fluorine-containing resin film which is provided on the surface layer should be highly transparent to light, having a total light transmittance of 80% or more, preferably 85% or more, still preferably 90% or more. The term "total light transmittance" as used herein means a percent transmission measured with a haze meter TC-H III, supplied by Tokyo Densyoku K.K.

The fluorine-containing resin film preferably has a surface tension of 40 dyne/cm or less, particularly 35 dyne/cm or less, especially 31 dyne/cm or less, on its front side. Where the front side surface tension is greater than 40 dyne/cm, the anti-icing or anti-snow sticking properties tend to reduce. The surface tension is primarily governed by the constituent material.

The surface tension of the reverse side of the fluorine-containing resin film, i.e., the side to be brought into contact with a printed layer, is preferably increased by surface treatment to 31 dyne/cm or more, particularly 35 dyne/cm or more, especially 40 dyne/cm or more, so as to secure good adhesion to the printed layer.

Suitable surface treatments for obtaining a desired surface tension include a corona discharge treatment, blasting, chemical etching, and a flame treatment. A corona discharge treatment is preferred from the standpoint of appearance after the treatment. A corona discharge treatment can be carried out by, for example, using a corona surface treater having a ceramic electrode supplied by Kasuga Denki, Inc. under a condition of 120 W/m²·min. Chemical etching can be conducted by, for example, using a sodium-naphthalene complex solution in tetrahydrofuran (SD-N, available from Kawaken Fine Chemicals Co., Ltd.) or a chromic acid mixture (e.g., immersing in a 70:20:10 mixture of chromic acid:water:sulfuric acid at 70° C. for 15 minutes followed by washing with water). Note that the front side of the film should not be subjected to the surface treatment because the surface treatment will impair the anti-staining properties.

The term "surface tension" as used for the fluorine-containing resin film means a value measured as follows. For films whose surface tension is 31 dyne/cm or more, wettability standard solutions for wettability test having different surface tensions (available from Wako Pure Chemical Ind., Co., Ltd.) are applied to a film in a line at 23° C. and 65% RH and observed with the naked eye after about 3 seconds from application. The surface tension of the film is decided from the number of the standard solution that does not run away on the film. For films whose surface tension is less than 31 dyne/cm, the angle of contact with a methanol/water mixture is measured by a liquid drop method to determine the surface tension.

The thickness of the fluorine-containing resin film is not particularly limited and is subject to wide variation according to the use of the retroreflective sheeting. In general, it can range 1 to 100 $\mu$m, preferably 5 to 80 $\mu$m, still preferably 10 to 70 $\mu$m, particularly preferably 20 to 60 $\mu$m.

Fluorine-containing resins making the film include homopolymers of fluoro-olefinic monomers (e.g., tetrafluoroethylene, chlorotrifluoroethylene, trifluoroethylene, vinylidene fluoride, vinyl fluoride, and hexafluoropropylene) and other fluoro-monomers (e.g., perfluoroalkyl vinyl ethers and perfluoroalkyl (meth)acrylates) and copolymers comprising two or more of these fluoro-monomers or a combination of at least one of these fluoro-monomers and other copolymerizable monomer(s). Mixtures of the fluorine-containing resins and other resins are also useful.

The copolymerizable monomers that can be used in combination with fluoro-monomers include olefins, e.g., ethylene and propylene; (cyclo)alkyl vinyl ethers, e.g., methyl vinyl ether, ethyl vinyl ether, n-butyl vinyl ether, cyclohexyl vinyl ether and cyclopentyl vinyl ether; carboxylic acid vinyl esters, e.g., vinyl acetate, vinyl propionate, vinyl pivalate, vinyl "Versatate" (a trade name of Shell Chemical Co.,), vinyl benzoate, vinyl p-t-butylbenzoate, vinyl cyclohexanecarboxylate, and isopropenyl acetate; halogenated vinyl compounds except fluorinated ones, e.g., vinyl chloride and vinylidene chloride; (meth)acrylic esters, e.g., methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, 2-ethylhexyl (meth)acrylate, n-octyl (meth)acrylate, isooctyl (meth)acrylate, n-nonyl (meth)acrylate, isononyl (meth)acrylate, and lauryl (meth)acrylate; hydroxyl-containing monomers, e.g., 2-hydroxyethyl vinyl ether, 3-hydroxypropyl vinyl ether, 4-hydroxybutyl vinyl ether, 2-hydroxyethyl allyl ether, and 2-hydroxyethyl (meth) acrylate; carboxyl-containing monomers, e.g., acrylic acid and methacrylic acid; amino-containing monomers, e.g., N,N-dimethylaminoethyl (meth)acrylate, N,N-diethylaminoethyl (meth)acrylate, and N,N-diethylaminoethyl vinyl ether; epoxy-containing monomers, e.g., glycidyl vinyl ether and glycidyl (meth)acrylate; hydrolyzable silyl-containing monomers, e.g., trimethoxyvinylsilane, triethoxyvinylsilane, 2-trimethoxysilylethyl vinyl ether, and γ-methacryloxypropyltrimethoxysilane; siloxy-containing monomers, e.g., 2-trimethylsiloxyethyl vinyl ether and 4-trimethylsiloxybutyl vinyl ether; and siloxycarbonyl-containing monomers, e.g., trimethylsilyl (meth)acrylate and vinyl 5-trimethylsiloxycarbonylpentanoate.

Fluorine-containing resins particularly preferred in the present invention include polytetrafluoroethylene, tetrafluoroethylene/perfluoroalkyl vinyl ether copolymers, tetrafluoroethylene/hexafluoropropylene copolymers, tetrafluoroethylene/hexafluoro-propylene/perfluoroalkyl vinyl ether copolymers, tetrafluoroethylene-ethylene copolymers, polychlorotrifluoroethylene, chlorotrifluoroethylene-ethylene copolymers, polyvinylidene fluoride, and polyvinyl fluoride.

Mixtures of the fluorine-containing (co)polymers with other resins are also employable. Useful resins that can be combined with the fluorine-containing resins include polyacetal resins, polycarbonate resins, polyamide resins, polystyrene resins, acrylic resins, vinyl acetate resins, polyurethane resins, phenolic resins, and polyimide resins.

Of the above-described fluorine-containing resins, particularly suitable are tetrafluoroethylene-ethylene copolymers having a tetrafluoroethylene unit content of 15 to 85% by weight (preferably 25 to 75% by weight, still preferably 35 to 65% by weight) and polyvinylidene fluoride, which desirably have a weight average molecular weight of 5,000 to 400,000, particularly 7,000 to 300,000, from the standpoint of processability and film durability.

Where these particularly suitable fluorine-containing resins are used in combination with other resins, it is preferred that they be used in a proportion of at least 70% by weight, particularly 80% by weight or more, especially 90% by weight or more, based on the mixture.

Examples of commercially available resins comprising a fluoro-olefinic monomer unit that can be used in the present invention are Fluon, Aflon TFE, and Aflon COP (all available from Asahi Glass Co., Ltd.); Polyflon TFE, Neoflon FEP, Neoflon PFA, and Neoflon ETFE (all available from Daikin Industries, Ltd.); and Teflon TFE, Teflon FEP, Teflon PFA, Teflon EPE, and Tefzel (all available from Du Pont-Mitsui Fluorochemicals Co., Ltd.).

If desired, the fluorine-containing resin can contain additives such as heat stabilizers, light stabilizers, crosslinking agents, and colorants as long as the physical properties of the resin film such as total light transmittance and surface tension are not impaired.

The fluorine-containing resin film is preferably formed by melt molding methods, such as melt extrusion and calendering.

A printed layer is formed on the fluorine-containing resin film, specifically on the surface-treated side thereof, by gravure printing or a like printing technique. The resin film having the printed layer is adhered to the smooth surface layer (flat front face) of the retroreflective base via an adhesive layer, preferably a pressure-sensitive adhesive layer, with the printed layer inside.

Figure 5:
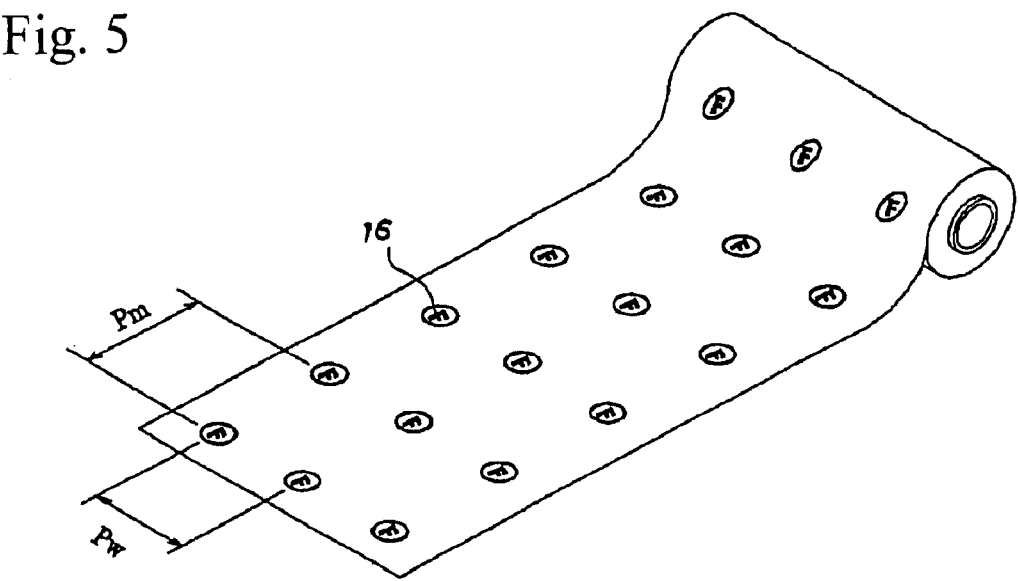
FIG. 5 is a perspective view showing a configuration of a printed pattern of a printed layer.
Figure 6:
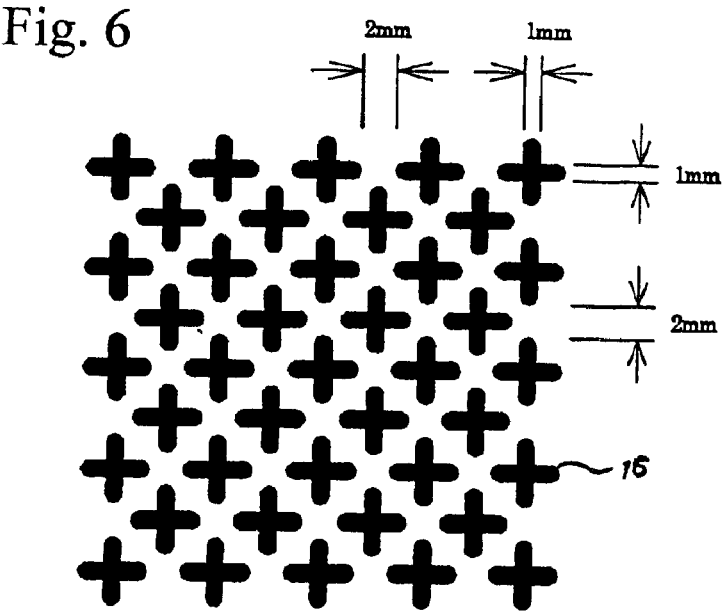
FIG. 6 is a perspective showing another configuration of a printed pattern of a printed layer.

The printed layer must be made of discontinuous printed parts isolated from one another. For example, the printed layer is preferably a layer of a repetitive pattern made up of independent printed parts 16 comprising a unit pattern as shown in FIGS. 5 and 6. Because the printed parts 16 are disposed discontinuously, even when water, a solvent, etc. enters the interface between the fluorine-containing resin film and the printed layer as a result of outdoor use or a cleaning operation with a solvent to remove stains or dirt, the penetrating water, solvent, etc. stays in the independent printed parts and is not allowed to spread all over the retroreflective sheeting.

The repeating unit pattern includes, but is not limited to, figures, such as circles, ellipses, squares and rectangles, geometric patterns composed of straight lines or curved lines, letters, symbols, and combinations thereof.

It is preferred that the maximum printed length of the unit patterns (e.g., figures, straight or curved lines, letters and symbols) be 10 mm or smaller, particularly 5 mm or smaller, especially 2 mm or smaller. Where the printed length exceeds 10 mm, water, a solvent, etc. may easily penetrate and spread to cause lifting or separation of the fluorine-containing resin film.

As far as the unit patterns are arranged independently of one another, the interval is not particularly limited but is preferably 1 mm or more, still preferably 5 mm or more, especially 10 mm or more, at the narrowest. If the narrowest distance between adjacent unit patterns is less than 1 mm, water, a solvent, etc. may enter and spread to cause lifting or separation of the fluorine-containing resin film.

The printed layer is preferably such that the total printed area be not more than 80%, particularly 40% or less, especially 20% or less, based on the entire area of the surface layer. If the ratio of the printed area exceeds 80%, water, a solvent, etc. tends to penetrate and spread to cause lifting or separation of the fluorine-containing resin film.

The printed layer is preferably formed of a printing ink composition comprising at least one binder resin selected from the group consisting of fluorine-containing resins, acrylic resins, polyester resins, urethane resins, and vinyl chloride resins.

In adhering the fluorine-containing resin film having the printed layer to the smooth surface layer (flat front face side) of the retroreflective base via an adhesive layer, the adhesive layer is formed either on the fluorine-containing resin or the surface layer of the retroreflective base. Otherwise, an adhesive previously applied to an appropriate release sheet is transferred to either the fluorine-containing resin or the surface layer of the retroreflective base.

The thickness of the adhesive layer is subject to variation according to the kind of the adhesive, the thickness of the fluorine-containing resin film, and the like. It is usually in a range of from 5 to 80 μm, preferably 10 to 70 μm, still preferably 20 to 60 μm.

The adhesive which can be used to form the adhesive layer preferably includes pressure-sensitive adhesives mainly comprising self-adhesive resins whose glass transition temperature (Tg) ranges from −100° C. to 50° C., particularly from −80° C. to 20° C.

Self-adhesive resins that have commonly been employed in pressure-sensitive adhesive compositions can be used in the present invention with no particular restriction. For example, acrylic resins, urethane resins, ethylene-vinyl acetate copolymer resins, and silicone resins can be used, with acrylic resins being preferred.

Suitable acrylic self-adhesive resins include those obtained by copolymerizing (A) at least one acrylic acid $C_2$–$C_{12}$ alkyl ester, such as ethyl acrylate, n-propyl acrylate, n-butyl acrylate, isobutyl acrylate, n-pentyl acrylate, 2-methylbutyl acrylate, n-hexyl acrylate, 2-ethylhexyl acrylate, n-octyl acrylate, isooctyl acrylate, n-nonyl acrylate, and isononyl acrylate, and (B) at least one acrylic monomer having a functional group, such as acrylic acid, methacrylic acid, acrylamide, N-methylolacrylamide, 2-hydroxyethyl acrylate, and 2-hydroxyethyl methacrylate, in such a copolymerization ratio to produce a copolymer whose Tg falls within the above-specified range. A suitable (A)/(B) copolymerization ratio is 99.5/0.5 to 70/30, particularly 99/1 to 75/25, by weight.

Particularly preferred acrylic self-adhesive resins are copolymers of butyl acrylate (BA) and acrylic acid copolymers (AA) having a BA/AA weight ratio of 99.1/0.9 to 70/30, particularly 99.5/0.5 to 80/20.

For the purpose of improving weatherability of the adhesive layer per se and the retroreflective base, it is preferred to add an ultraviolet absorber to the adhesive. If desired, a light stabilizer can also be added to the adhesive.

UV absorbers that can be added to the self-adhesive resins preferably include those showing a maximum absorption in a wavelength region of 340 to 353 nm, particularly 343 to 346 nm. UV absorbers of cyanoacrylate type, benzotriazole type, benzophenone type, salicylic acid type or hydroquinone type can be used. Those which are of reactive type are allowed to react with the self-adhesive polymer as produced or allowed to react with monomers before polymerization.

The benzotriazole UV absorbers include 2-(3,5-di-t-butyl-2-hydroxyphenyl)benzo-triazole, 2-[2-hydroxy-3,5-bis(α,α- dimethylbenzyl)phenyl]-2H-benzotriazole, and 2-(3,5-di-t-amyl-2-hydroxyphenyl]benzotriazole. The benzophenone UV absorbers include 2-hydroxy-4-octoxybenzophenone, 2,4-dihydroxybenzophenone, and 2-hydroxy-4-methoxy-2'-carboxybenzophenone. The salicylic acid UV absorbers include phenyl salicylate, p-octylphenyl salicylate, resorcinol monobenzoate, and 4-t-butylphenyl salicylate. The cyanoacrylate UV absorbers include ethyl 2-cyano-3,3-diphenylacrylate and 2-ethylhexyl 2-cyano-3,3-diphenylacrylate. Benzotriazole UV absorbers are preferred among them.

The UV absorber is usually added in an amount of 0.5 to 10 parts, preferably 0.6 to 9 parts, still preferably 0.7 to 8 parts, by weight per 100 parts by weight (on solid basis) of the self-adhesive resin.

The light stabilizers that can be added to the adhesive include hindered amine or hindered phenol type light stabilizers, with the hindered amine type being preferred. While not limiting, the hindered amine light stabilizers generally have a large molecular weight. Those having an N-substituted piperidinol nucleus and generally having a weight average molecular weight of 400 to 10,000, particularly 500 to 5,000, are suitable. Such hindered amine light stabilizers include high-molecular esters between butanetetracarboxylic acid and an N-substituted piperidinol. Examples of commercially available hindered amine light stabilizers that are suitably used in the invention are MARK LA-63 (available from Adeca Argus), MARK LA-62 (available from Adeca Argus), and TINUVIN-622LD (available from Ciba-Geigy (Japan) Ltd.). The high-molecular hindered amine light stabilizers are prevented from bleeding and thereby exhibit their performance for a long time.

The amount of the light stabilizer, while varying according to the kind, generally ranges from 0.5 to 5 parts, preferably 0.6 to 4 parts, still preferably 0.7 to 3 parts, by weight per 100 parts by weight of the self-adhesive resin on a solid basis.

The adhesive can additionally contain other components customarily used in the art, such as solvents (e.g., ethyl acetate and ethyl acetoacetate), colorants, i.e., dyes and pigments, crosslinking agents (e.g., isocyanates, epoxy compounds, melamines, and aluminum chelates), and crosslinking accelerators (e.g., dibutyltin laurate).

While the adhesive is applicable to either the fluorine-containing resin film or the surface layer of the retroreflective base as noted above, it is convenient in the practice that the adhesive is applied to the fluorine-containing resin film, and the formed adhesive layer is covered with a release sheet, etc., which is stripped on use, and adhered to the surface layer of the retroreflective base by pressure application.

The present invention will now be illustrated in greater detail with reference to Examples and Comparative Examples. The following Examples are presented as being exemplary of the present invention and should not be considered as limiting. Unless otherwise specified, all the percents and parts are given by weight. The retroreflective sheets prepared in Examples and Comparative Examples were tested according to the following methods.

(1) Anti-icing Properties

A retroreflective sheet was stuck to an aluminum plate (7.5 cm by 15 cm) to prepare a test piece. The test piece was placed upright in an atmosphere of −30° C., and water was sprayed on the entire surface of the retroreflective sheet. After 24 hours the icing condition was observed to rate the anti-icing properties according to the following 1-to-5 scale.

5 . . . The iced area is less than 5% of the total area.

4 . . . The iced area is 5% or more and less than 10% of the total area.

3 . . . The iced area is 10% or more and less than 20% of the total area.

2 . . . The iced area is 20% or more and less than 30% of the total area.

1 . . . The iced area is 30% or more of the total area.

(2) Anti-snow Sticking Properties

A retroreflective sheet was stuck to an aluminum plate (1 m by 1.5 m) to prepare a test piece. The test piece was fixed upright outdoors in a snowfall. After 24 hours the condition of snow adhering to the surface was observed to rate the anti-snow sticking properties according to the following 1-to-5 scale.

5 . . . The snow-stuck area is less than 5% of the total area.

4 . . . The snow-stuck area is 5% or more and less than 10% of the total area.

3 . . . The snow-stuck area is 10% or more and less than 20% of the total area.

2 . . . The snow-stuck area is 20% or more and less than 30% of the total area.

1 . . . The snow-stuck area is 30% or more of the total area.

(3) Retroreflection Performance

Retroreflection performance of a retroreflective sheet was tested according to the test method specified in JIS Z9117. The viewing angle was 0.2°, and the incident angle was 5°.

(4) Flexibility

A retroreflective sheet was cut into a size of 10 cm by 10 cm. The release sheet on the back side of the cut piece was stripped off to expose the pressure-sensitive adhesive layer, and the cut piece was stuck around a vinyl chloride resin pipe having a diameter of about 5 cm and held for fixation for 10 seconds in an atmosphere of 5° C. After removing fixation, the condition of adhesion was observed to rate the flexibility of the sheeting according to the following 1-to-3 scale.

3 . . . Defects such as lifting and peeling are not observed.

2 . . . Defects such as lifting and peeling are observed in an area within 10 mm from the edges.

1 . . . Defects such as lifting and peeling are observed in an area more than 10 mm away from the edges.

(5) Stain Cleanability

The surface of a retroreflective sheet was stained with a black oily ink felt-tip marker. After 5 minutes for drying, stain cleanability was evaluated and rated as follows.

5 . . . The stain is easily wiped off with a dry cloth, leaving no traces.

4 . . . The stain is wiped off by strong rubbing with a dry cloth, leaving no traces.

3 . . . The stain is not completely wiped off by strong rubbing with a dry cloth but is completely removed by wiping with a cloth impregnated with water or ethyl alcohol to leave no traces.

2 . . . The stain is removed by wiping with a cloth impregnated with water or ethyl alcohol but leaves its traces.

1 . . . The stain is unremovable even by wiping with a cloth impregnated with water or ethyl alcohol.

(6) Adhesion of Printed Layer

A retroreflective sheet was stuck to an aluminum plate (50 mm×50 mm×1 mm (t)) to prepare a test piece. The test piece was subjected to 1000-hour accelerated aging by light and water (weatherability test) by use of a WS Model sunshine carbon arc lamp type accelerated weathering tester as specified in JIS A1415-1977. Then, the resin film was peeled off to evaluate the adhesion of the printed layer according to the following rating system.

5 . . . Separation takes place between the adhesive layer and the surface layer of the retroreflective base all over the printed area.

4 . . . Separation takes place between the adhesive layer and the surface layer of the retroreflective base in 76% or more and less than 100% of the total area of the printed parts.

3 . . . Separation takes place between the adhesive layer and the surface layer of the retroreflective base in 33% or more and less than 76% of the total area of the printed parts.

2 . . . Separation takes place between the adhesive layer and the resin film all over the printed area.

1 . . . The resin film peels off after the weatherability test.

EXAMPLE 1

A side of a tetrafluoroethylene-ethylene copolymer film having a thickness of about 40 $\mu$m, a surface tension of 23 dyne/cm and a total light transmittance of 92% (Aflex COP, available from Asahi Glass Co., Ltd.) was treated in a corona surface treater supplied by Kasuga Denki, Inc. to increase its surface tension to 42 dyne/cm.

The surface-treated side of the resin film was printed in black opaque ink having the following composition by gravure printing to have a repetitive pattern of circled letters whose minimum length was 1 mm which were arranged on intersections of an imaginary check pattern at a pitch of 150 mm in both the machine direction (pitch Pm) and the width direction (pitch Pw) as shown in FIG. 5.

Ink Composition:

Polyester ink binder 9.5%

Carbon black 0.1%

Ethylene glycol monoethyl acetate 69.4%

$C_9$-Petroleum cut 21.0%

Separately, an adhesive composition consisting of 294 parts of a 34% solution of a butyl acrylate (BA)/acrylic acid (AA) copolymer (BA/AA=90/10 by weight) in a mixed solvent of ethyl acetate/toluene (4/6), 1.4 part of a benzotriazole UV absorber (Tinuvin 328, available from Ciba Geigy Ltd.), 0.7 part of a hindered amine light stabilizer (Tinuvin 622LP, available from Ciba Geigy Ltd.), and 0.3 part of a 75% solution of a hexamethylene diisocyanate crosslinking agent in a mixed solvent of 1-methoxypropyl acetate-2/xylene (1/1) was applied to a release sheet and dried to form a pressure-sensitive adhesive layer having a thickness of about 50 $\mu$m. The adhesive layer with release sheet was adhered to the printed side of the resin film.

The release sheet was stripped off, and the printed resin film with pressure-sensitive adhesive was stuck to the surface layer (flat front face) of a commercially available white encapsulated lens retroreflective sheet (Nikkalite SEG 15012, available from Nikka Polymer K.K.) to obtain a retroreflective sheet having a printed fluorine-containing resin film as a surface layer. The resulting retroreflective sheet was tested according to the above-described test methods. The results obtained are shown in Table 1 below.

EXAMPLE 2

A retroreflective sheet having a printed layer was obtained in the same manner as in Example 1, except for using a commercially available white encapsulated cube-corner retroreflective sheet (Nikkalite Crystal Grade 92802, available from Nippon Carbide Industries Co., Inc.) as a base. The resulting retroreflective sheet was tested according to the above-described test methods. The results obtained are shown in Table 1 below.

EXAMPLE 3

A retroreflective sheet having a printed layer was obtained in the same manner as in Example 1, except for using a polyvinylidene fluoride (PVdF) film having a thickness of about 50 $\mu$m, a surface tension of 25 dyne/cm and a total light transmittance of 92% (DX Film 14S0050, available from Denki Kagaku Kogyo K.K.) as a fluorine-containing resin film and treating the side of the resin film to be printed by a corona discharge treatment to increase the surface tension to 43 dyne/cm. The resulting retroreflective sheet was tested according to the above-described test methods. The results obtained are shown in Table 1 below.

EXAMPLE 4

A retroreflective sheet having a printed layer was obtained in the same manner as in Example 1, except that the surface-treated side of the resin film was printed in gray semi-transparent ink having the following composition by gravure printing to have a repetitive pattern of crosses whose minimum length was 1 mm which were arranged in a zigzag at a pitch of 2 mm in both the machine direction (pitch Pm) and the width direction (pitch Pw) as shown in FIG. 6. The resulting retroreflective sheet had a gray appearance.

Ink Composition:

Polyester ink binder 9.59%

Carbon black 0.01%

Ethylene glycol monoethyl acetate 69.4%

$C_9$-Petroleum cut 21.0%

The resulting retroreflective sheet was tested according to the above-described test methods. The results obtained are shown in Table 1 below.

COMPARATIVE EXAMPLE 1

A retroreflective sheet having a printed layer was obtained in the same manner as in Example 1, except for using a polyethylene terephthalate (PET) film having a thickness of about 38 $\mu$m, a surface tension of 41 dyne/cm and a total light transmittance of 93% (Teijin Tetoron S-38, available from Teijin Ltd.) in place of the fluorine-containing resin film. The resulting retroreflective sheet was tested according to the above-described test methods. The results obtained are shown in Table 1 below.

COMPARATIVE EXAMPLE 2

A gray retroreflective sheet having a printed layer was obtained in the same manner as in Example 1, except that the surface-treated side of the resin film was printed solid by gravure printing. The resulting retroreflective sheet was tested according to the above-described test methods. The results obtained are shown in Table 1 below.

TABLE 1

|  | Example | | | | Comparative Example | |
| --- | --- | --- | --- | --- | --- | --- |
|  | 1 | 2 | 3 | 4 | 1 | 2 |
| Anti-icing properties | 5 | 5 | 4 | 5 | 1 | 5 |
| Anti-snow sticking properties | 5 | 5 | 4 | 5 | 1 | 5 |
| Retroreflection performance | 320 | 820 | 304 | 120 | 294 | 65 |
| Flexibility | 5 | 3 | 4 | 5 | 3 | 5 |
| Stain cleanability | 5 | 5 | 4 | 5 | 1 | 5 |
| Printed layer adhesion | 4 | 4 | 5 | 4 | 5 | 2 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Retroreflective sheeting comprising a retroreflective base having a light-incident layer on the light-incident side thereof and a fluorine-containing resin film having a total light transmittance of 80% or more which is laminated on said light-incident layer on contact with an adhesive layer, wherein a printed layer made of discontinuous and individual printed parts is provided between said fluorine-containing resin film and said adhesive layer, the discontinuous and printed parts being isolated from one another, a maximum printed length of each part being 10 mm or smaller, an interval of isolation between each part and an adjacent part being at least 1 mm at the narrowest.

2. The retroreflective sheeting according to claim 1, wherein said printed layer is formed of printing ink composition comprising at least one binder resin selected from the group consisting of fluorine-containing resins, acrylic resins, polyester resins, urethane resins, and vinyl chloride resins.

3. The retroreflective sheeting according to claim 1, wherein said printed layer is a layer of a repetitive pattern made up of individual printed parts of a same design which are isolated from one another.

4. The retroreflective sheeting according to claim 3, wherein the maximum printed length of said individual printed parts is each 10 mm.

5. The retroreflective sheeting according to claim 3, wherein the interval of said printed parts is 1 mm at the narrowest.

6. The retroreflective sheeting according to claim 1, wherein the total area of said printed layer is 80% or less based on the entire area of said light-incident layer.

7. The retroreflective sheeting according to claim 1, wherein said fluorine-resin cotaining film has its side to be in contact with said printed layer treated by a surface treatment so as to have a surface tension of 31 dyne/cm or more.

8. The retroreflective sheeting according to claim 7, wherein said surface treatment is a corona discharge treatment.

9. The retroreflective sheeting according to claim 1, wherein said fluorine-containing resin film has a total light transmittance of 85% or more.

10. The retroreflective sheeting according to claim 1, wherein said fluorine-containing resin film comprises tetrafluoroethylene-ethylene copolymers or polyvinylidene fluoride.

11. The retroreflective sheeting according to claim 10, wherein said tetrafluoroethylene-ethylene copolymers have a tetrafluoroethylene unit content of 5 to 85% by weight.

12. The retroreflective sheeting according to claim 1, wherein said adhesive layer comprises a pressure-sensitive adhesive.

13. A retroreflective sheet, comprising:
a retroreflective base provided with a surface layer on a light-incident side;
an adhesive layer provided on and in contact with the light-incident side of the retroreflective base;
a printed layer of discontinuous and individual printed parts provided on and in contact with the adhesive layer; and
a fluorine-containing resin film having a total light transmittance of at least 80% provided on said adhesive layer and on said printed layer, the resin film contacting the printed layer and contacting the adhesive layer in areas apart from the printed layer,
the discontinuous and printed parts being isolated from one another, a maximum printed length of each part being 10 mm or smaller, an interval of isolation between each part and an adjacent part being at least 1 mm at the narrowest.

14. The sheeting of claim 13, wherein the base comprises:
a releasing layer;
a base adhesive layer contacting the releasing layer;
a reflective layer provided on the base adhesive layer; and
a prism layer contacting the reflective layer,
the surface layer contacting the prism layer.

15. The sheeting of claim 13, wherein the based comprises:
a releasing layer;
a base adhesive layer contacting the releasing layer;
a support layer contacting the base adhesive layer;
a binder layer contacting the support layer;
beads embedding in the binder layer; and
a beads fixing layer covering the beads,
the surface layer contacting the beads fixing layer.

16. The sheeting of claim 13, wherein a side of the fluorine-containing film in contact with said printed layer has a surface tension of at least 31 dynes/cm.

17. The sheeting of claim 13, wherein,
the adhesive layer is a pressure-sensitive adhesive layer; and
the printed layer comprises plural independent printed parts arranged in a repetitive pattern, each of the printed parts being separated from the other printed parts, and each one of the printed parts is a geometric duplicate of other ones of the printed parts.

18. The sheeting of claim 17, wherein the maximum dimension of the independent printed parts is 10 mm.

19. The sheeting of claim 13, wherein the independent printed parts are arranged with a separation interval of 1 mm.

* * * * *